United States Patent [19]
Smith, Jr.

[11] Patent Number: 5,662,478
[45] Date of Patent: Sep. 2, 1997

[54] METHOD FOR TRAINING FACILITATOR AND METHOD FOR TEACHING GROUP OF PEOPLE IN THE USE OF AN EXPEDITIONARY MAP TO PRACTICE A PROCESS FOR GENERATING IDEAS

[76] Inventor: Rolf C. Smith, Jr., 10682 Beinhorn Rd., Houston, Tex. 77024

[21] Appl. No.: 411,244

[22] Filed: Mar. 27, 1995

[51] Int. Cl.⁶ .................................................. G09B 19/00
[52] U.S. Cl. ........................... 434/237; 434/238; 434/236; 434/428
[58] Field of Search ..................... 434/237, 236, 434/238, 433, 365, 428, 107, 130, 150, 219

[56] References Cited

U.S. PATENT DOCUMENTS 5,183,297  2/1993  Bodziak et al. ........................... 283/67

OTHER PUBLICATIONS

Behar, M.F.; "Classification: Keys to Know–How in Instrument Work"; Instuments (Magazine), vol. 24, pp. 393–399 Apr. 1951.

Avis, Warren E.; "The Art of Sharing"; Cornerstone Library, Inc., New York NY; pp. 162–192 1974.

Rovner, Sandy; "Confronting the Unspeakable"; The Washington Post, pp. H1, H4, and H5 May 3, 1981.

Easterly, Jean L.; "Model Building for Simulation Games"; Educational Technology (Magazine) Jan. 1978.

*Primary Examiner*—Jeffrey A. Smith
*Attorney, Agent, or Firm*—John R. Casperson; Chamberlain, Hrolicks et al.

[57] ABSTRACT

A map which illustrates the expeditionary process is used as a tool in creative thinking sessions. When groups of people are assembled to execute a creative problem solving session, one of the primary sources of discord is due to a lack of understanding by the members of the group of their current position in the flow of the process. The map reduces this discord by providing a tool which enables the members of the group to estimate their present position in the flow of the process, because the process of generating problem solving ideas is very analogous to the expeditionary process.

6 Claims, 1 Drawing Sheet

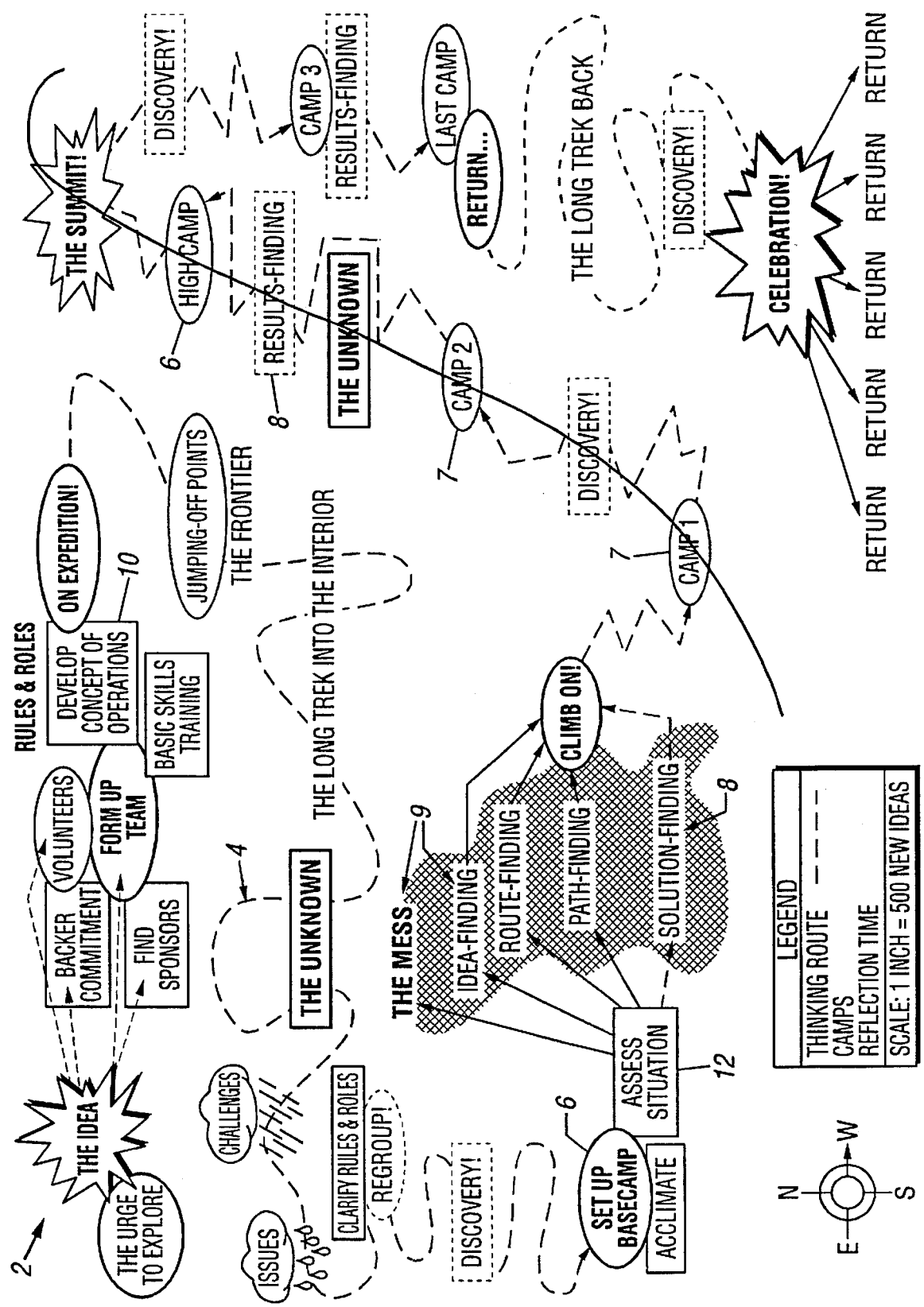

METHOD FOR TRAINING FACILITATOR AND METHOD FOR TEACHING GROUP OF PEOPLE IN THE USE OF AN EXPEDITIONARY MAP TO PRACTICE A PROCESS FOR GENERATING IDEAS

BACKGROUND OF THE INVENTION

In one aspect, the invention relates to the generation of ideas through a variety of creative thinking techniques. In another aspect, the invention relates to providing an environment which is conducive to problem solving by use of brainstorming techniques.

One tried and true technique for generating truly innovative solutions to situations facing organizations of all sizes is brainstorming. In one form of brainstorming, the organization assembles a diverse group of people and gives them the mission of proposing a solution to a situation. The members of the group often have little or no idea of the nature of the situation, the possible causes of or solutions for the situation, or of how the group should function to discharge its mission.

Brainstorming is usually conducted with a facilitator who provides guidance on brainstorming rules and administrates the brainstorming process. Experienced facilitators know the various stages of uncertainty, frustration and creativity that the members of the group will experience in their route to a solution, but heretofore did not have a tool available to communicate an understanding of these stages to the members of the group.

The elimination or reduction of the time and energy spent by the group in the stages of uncertainty or frustration would permit more and better time to spent in the creative stages of the process, thereby generating more cost effective results.

OBJECTS OF THE INVENTION

It is an object of this invention to provide a creative thinking tool to reduce the amount of time spent by the group in uncertainty and frustration.

It is a further object of this invention to provide a creative thinking tool to increase the quality of generated results.

It is another object of this invention to provide a creative thinking environment which leads to the generation of more cost effective results.

It is another object of this invention to provide a technique for teaching a creative thinking process to a group in a manner which is more easily understood by the members of the group.

SUMMARY OF THE INVENTION

In one embodiment of the invention, there is provided an improved process for generating problem-solving ideas from a group of people. It is known that in order to obtain good results from the group of people, it is necessary to provide an environment for the group to execute one or more creative thinking sessions to generate ideas for solving the problem. The invention comprises providing a map in such environment which illustrates an expeditionary path through the problem solving process.

When groups of people are assembled to execute a creative problem solving session, one of the primary sources of discord is due to a lack of understanding by the members of the group of their current position in the flow of the process. The map reduces this discord by providing a tool which enables the members of the group to estimate their present position in the flow of the process, because the process of generating problem solving ideas is very analogous to the expeditionary process.

In a further embodiment of the invention, there is provided an environment for a group of people gathered together for generating ideas for solving a problem. The environment is characterized by a means for providing a map which illustrates an expeditionary path.

In another embodiment of the invention, there is provided a method for training a facilitator to enable a group of people to execute one or more creative thinking sessions to generate ideas for solving a problem. Generally speaking, the method comprises providing the facilitator with a map which illustrates an expeditionary path together with training on the use of the map in creative thinking sessions. The map can be as previously described. The facilitator is trained on the comparison of certain aspects of a process for generating ideas for solving a problem to certain aspects of an expeditionary process in order to relate the concept to the members of the group and on the provision of supporting audio and visual information to the group to enable the group to estimate its present position in the flow of the process. The facilitator is also trained on how to lead the group of people in a continuous flow of increasingly creative thinking sessions.

BRIEF DESCRIPTION OF THE DRAWINGS

The FIGURE illustrates a map that can be used in the practice of various embodiments of the invention.

DETAILED DESCRIPTION OF THE PREFERRED EMBODIMENTS

In one embodiment of the invention, there is provided an improved process for generating problem-solving ideas from a group of people. It is known that in order to obtain good results from the group of people, it is necessary to provide an environment for the group to execute one or more creative thinking sessions to generate ideas for solving the problem. The process for generating problem-solving ideas can be greatly improved by providing a providing a map 2 which illustrates an expeditionary path 4 through the problem solving process.

A suitable map 2 is shown in the accompanying FIGURE. Generally speaking, the path 4 is depicted on the map to illustrate a conceptual flow for a hypothetical expeditionary process. Information 6, generally in written form, is provided on the map alongside the path to illustrate the steps of an expeditionary process as such steps may occur during the course of the expedition. Preferably, information 8, also generally in written form, is provided on the map 2 alongside the path 4 to illustrate a flow of steps for a typical process for generating ideas for solving a problem as such steps may occur during the course of execution of the process.

As is apparent from the map, certain aspects of both an expedition and a process for generating ideas are common. For example, it is important to both processes for the participants to develop an understanding of what is going to happen during the course of the process, as indicated by block 10, "Develop Concept of Operations", and to assess available information during the course of the process, as indicated by block 12, "Assess Situation". The map 2 thus preferably contains information which permits comparison of certain aspects of a process for generating ideas for solving a problem and certain aspects of an expeditionary process.

When groups of people are assembled to execute a creative problem solving session, one of the primary sources of discord is due to a lack of understanding by the members of the group of their current position in the flow of the process. This discord can be alleviated by providing audio and visual information to the members of the group which by can be used by them in estimating their present position in the flow of the process. Slides which focus on particular portions of the path as depicted by the map and orally conveyed information to the group by a facilitator or guide are highly effective for this purpose. The result is that the group is able to reach quicker and better outcomes.

In addition to the map, exposing the group to other expedition-related stimuli appears to have a beneficial effect. Audio-visual information and role-playing are particularly effective. For example, providing audio and visual information relating to an expedition, such as a previously recorded climbing or exploration expedition, can be highly motivational. Providing each member of the group with a copy of the map is also very beneficial, especially when the map has been printed on recycled map paper. Printing the map on the reverse side of topographical maps is preferred, because it provides a unique, expedition-related look and feel to the map and draws each group member into the concept. Expedition-related role playing, such as lack of a set schedule, the provision of snacks instead of meals, the provision of water instead of prepared beverages, the provision of expedition-related clothing, and the use of expedition related analogies in describing the creative process all contribute to a most favorable environment.

In another embodiment of the invention, there is provided an environment for a group of people gathered together for generating ideas for solving a problem. The environment is characterized by a means for providing a map which illustrates an expeditionary path leading though the process for solving a problem. The map can be in printed form, as previously described. A map image generated by an imaging device such as a slide projector can also be used.

Preferably a means is provided for illustrating a path on the map to depict a flow for an expeditionary process and information on the map alongside the path to illustrate steps of an expeditionary process, as previously described. A means is also preferably provided for illustrating information on the map alongside the path to depict a flow of steps for a process for generating ideas for solving a problem, as previously described. Suitable illustration means can be printing, photocopying, or imaging devices such as a slide projector or a computer with the necessary peripherals.

The environment is preferably further characterized by a means for providing audio and prerecorded visual information relating to an expedition. A video cassette player coupled with a television set and loaded with a videocassette containing a prerecorded tape is highly suitable. Other items which are useful include a projector for displaying prerecorded visual information, am audio system for playing prerecorded audio information, a video system for playing prerecorded video tracks, slips of paper to write on during creative thinking sessions, receptacles to collect the slips of paper, and a flip chart for storyboarding the results of the creative thinking sessions. The environment can be further enhanced by the provision of means for simulating an expedition environment, such as a schedule, clothing requirements and expedition style food.

In another embodiment of the invention, there is provided a method for training a facilitator to enable a group of people to execute one or more creative thinking sessions to generate ideas for solving a problem. Generally speaking, the method comprises providing the facilitator with a map which illustrates an expeditionary path leading through the process for generating ideas for solving a problem and training on the use of the map in creative thinking sessions. The map can be as previously described. The facilitator is trained on the comparison of certain aspects of a process for generating ideas for solving a problem to certain aspects of an expeditionary process in order to relate the concept to the members of the group and on the provision of audio and visual information to the group to enable the group to estimate its present position in the flow of the process. The facilitator is also trained on how to lead the group of people in a continuous flow of increasingly creative thinking sessions.

Generally speaking, the facilitator is taught to enable the group to execute the process depicted in the FIGURE.

The process begins in a staging area environment in the vicinity of block 10 which provides the setting for teaching efficiency. How to practice the expedition process. Where the members of the group should focus. Learning what to do. What a thinking expedition really is—the basics of everything. Planning the expedition. Problem-Finding: Watch-out, dangers, safety. The group is provided with a staged expeditionary environment, roles, a mission, objectives, goals and rules and procedures.

The role of the facilitator (known as the guide) is to implement the process, explain the rules of the expedition, explain everyone's roles, record input, and guide the group to respond to the client's needs. The role of the client is as the owner of the situation being investigated; to provide the members of the group, to contribute during divergence and convergence, and to accept the result. The role of each group member is to provide brainpower, diversity, a unique perspective and viewpoint, to generate new ideas, to be willing to speculate and build on others ideas, to follow the facilitator's guidelines for divergence and convergence, and to participate in the process.

The guide also is taught to instruct the group on concepts and principles pertaining to a mindshift model. Generally speaking, the mindshift model states that in order to achieve different results, the members of the group must first think of how things can be done differently, and in order to think of how things can be done differently, the members must first learn to think differently, and in order to learn how to think differently, the members must first learn to think about thinking.

The guide is also taught to provide the group with brainstorming rules. Basically, these rules are to defer judgment on ideas, to try to maximize the quantity of ideas over quality of ideas, to contribute freewheeling ideas, and to contribute ideas which build on the ideas of others.

The guide is also taught to administer a psychological instrument to assess the creative style of each individual in the group.

At the jumping off point and during the trek in, the guide is taught to assist the members in learning how to become more effective at problem solving. They learn how to do the right things right—how to use the tools, techniques and processes gathered at the staging area. They begin to learn how to explore ideas and problems as a group and gain competence in their skills. They learn expedition protocols.

At this stage, the guide is taught to create an environment for the members of the group to discover data pertaining to a situation to be investigated (the Mess). A mess is a set of interconnected problems, challenges, issues, opportunities expectations and ideas. The guide is taught how to lead the group in analyzing the mess; expanding existing problems into broader purposes; exploring obstacles and desired outcomes and in leading the group in discovering information relating to the mess, such as is generally indicated at 7. The guide is taught to creating an environment for the group of people to redefine their roles, the mission, their objectives, their goals, and the rules by asking questions and by using techniques such as pairing and sharing. In pairing and sharing the guide asks each member to write down some key issues and discuss them with a first neighbor, and then to discuss the first neighbors issues with a second neighbor, and then to list new ideas or insights gained which are storyboarded by the guide.

The guide is taught to provide a base camp environment for the group to add to their skills by improving, copying and cutting. They learn how to have new ideas on how to become more efficient and effective. They acclimate to changes in environment and people. They investigate mess-finding and data finding. They build strengths and become more flexible. They learn to drop old habits, old tools. They practice mindshifting and developing an 80:20 focus, which essentially means that 80% of the benefit that is derived from an activity comes from 20% of the activity. Time is also provided in the base camp setting for interactions between members of the group-an opportunity for the members to learn memorable things about each other, an opportunity to reflect on what has occurred and an opportunity to learn memorable things about one's self.

As the group prepares to leave base camp, the guide creates an environment for leading the team into creative thinking sessions to create a small subset of defined problems from the mess and to start them thinking about opportunities and possible solutions. The guide leads the group into examining many possible problems within the mess; considering the situation from many different perspectives, and generating a variety of possible statements for the problems and subproblems. The guide then creates an environment for leading the team into creative thinking sessions to generate ideas and options for solving the subset of defined problems; to generate many possibilities and alternatives for responding to the challenge of the problem statement; to reconsider the problem statement and generate a variety of new problem statements from the perspective of the new ideas and possibilities; and to generate more ideas and alternatives for responding to the re-decided problem.

The ascent provides the environment, such as in camps 9, for transitioning the members of the team to out of the box thinking. The members learn what they do not know. They learn to observe and notice. They learn to improve by copying ideas and adapting what others know and do. They begin to understand the power of teaming up. Pairs, triads, quads, small rope teams are used. The environment is structured for the team to select particularly unique or unusual concepts or ideas for solving one or more of the defined problems. One technique which is used is for the guide to list the issues, ideas or options on a flip chart or a white board and to number the items sequentially. The members vote on the items using a BlueSlip as a vote tally. This can be done by rank order voting, where each member selects the top five ideas, assigns points 5 to 1, and the guide then aggregates assigned points; or by category voting, where each member categorizes the items as most urgent, very important, important but wait—and the guide tallies by means such as colored dots. Category voting can be then be followed by rank order voting to narrow the field.

The guide then creates an environment for implementing fundamental or incremental changes to at least some of the particularly unique or unusual concepts so as to increase their potential for implementation. This can be done by questioning designed to apply the seven levels of change model. In the seven levels of change model, ideas are improved by being made more efficient, more effective, adding other ideas, cutting out, copying, by being changed into things that no one else is doing, and by being changed into something that no one thinks possible. The ideas thus transformed are again cycled through the seven levels of change model for retransformation. The cycle continues until breakthrough ideas are developed. During this process additional tools are introduced to result in a mindshift at each level—the guide is taught to introduce pictures, music, smells, crayon drawings, walks outside, off the wall questions, multimedia presentation, etc. in order to stimulate creative responses. The tools are introduced when the group has a need for the tool. Just in time. The guide is taught to assist the group in formulating and applying many possible criteria for evaluating, comparing and selecting ideas; listing advantages, strengths, unique factors, limitations, and other issues to refine and focus the ideas.

The guide is taught to teach application of the Levels of Change Model to bring about improvement in ideas. Level 1 changes relate to improving efficiency. Level 2 changes relate to improving effectiveness. Level 3 changes relate to implementing changes to become more efficient and more effective. Level 4 changes relate to improvement by elimination. Level 5 changes relate to improvement by copying what others are doing. Level 6 changes relate to improving by doing things that no one else is doing and equate to high camp on the map. Level 7 changes relate to improving by doing things that others don't think is possible and equate to the summit on the map. Some people will contribute level 7 changes and some will not. Not everyone reaches the summit in an expedition.

After the summit and on the return, the guide is taught techniques for assisting the group in selecting solution paths that seem most promising; applying more specific criteria to evaluate, strengthen and refine the best ideas. Generally speaking the guide is taught to begin to create an environment for convergence at this stage—analyzing and selecting the most effective solutions, to determine potential barriers to implementation, selecting the most promising solution paths and focusing and formulating specific action steps into an action plan for implementation of the most promising solution paths.

While certain preferred embodiments of the invention have been described herein, the invention is not to be construed as being so limited, except to the extent that such limitations are found in the claims.

What is claimed is:

1. A method for teaching a group of people to practice a process for generating ideas for solving a problem by executing a plurality of creative thinking sessions, said method comprising providing the group of people with a facilitator;

providing the group of people with a map which illustrates an expeditionary path leading through the process for generating ideas for solving a problem, said map depicting a path which illustrates a flow for an expeditionary process and having a first information set alongside the path to illustrate steps of an expeditionary process as such steps may occur during the flow of an expeditionary process, and a second information set alongside the path to illustrate a flow of steps for a process for generating ideas for solving a problem from one or more creative thinking sessions as such steps may occur in a process for generating ideas for solving a problem;

conveying information to the group of people through the facilitator relating to comparing certain aspects of a process for generating ideas for solving a problem to certain aspects of an expeditionary process;

providing audio and visual information to the group of people so that the group of people can estimate its present position in the flow of the process for generating ideas for solving a problem, and leading the group of people through the facilitator in a continuous flow of increasingly creative thinking sessions.

2. A method as in claim 1 further comprising:

providing an environment for the group of people to execute one or more creative thinking sessions to generate ideas for solving a problem; and providing, in the environment, audio and visual information relating to an expedition.

3. A method as in claim 2 wherein the audio and visual information relating to the expedition is prerecorded.

4. A method as in claim 3 further comprising providing each person in the group of people with a copy of the map.

5. A method as in claim 4 further comprising providing each copy of the map on recycled map paper.

6. A method for training a facilitator to enable a group of people to practice a process for generating ideas for solving a problem by executing one or more creative thinking sessions, said method comprising conveying a map to the facilitator which illustrates an expeditionary path leading through the process for generating ideas for solving a problem, said map depicting a path which illustrates a flow for an expeditionary process and having a first information set alongside the path to illustrate steps of an expeditionary process as such steps may occur during the flow of an expeditionary process, and a second information set alongside the path to illustrate a flow of steps for a process for generating ideas for solving a problem from one or more creative thinking sessions as such steps may occur in a process for generating ideas for solving a problem;

conveying information to the facilitator relating to comparing certain aspects of a process for generating ideas for solving a problem to certain aspects of an expeditionary process;

conveying information to the facilitator relating to providing audio and visual information to the group of people so that the group of people can estimate its present position in the flow of the process for generating ideas for solving a problem, and conveying information to the facilitator relating to leading the group of people in a continuous flow of increasingly creative thinking sessions.

\* \* \* \* \*